(12) United States Patent
Catelli et al.

(10) Patent No.: US 11,332,703 B2
(45) Date of Patent: May 17, 2022

(54) PROCESS FOR THE TREATMENT AND THE WINEMAKING OF GRAPES

(71) Applicant: Pinco SA, Rancate (CH)

(72) Inventors: Cesare Catelli, Uggiate Trevano (IT); Fabio Mencarelli, Pisa (IT)

(73) Assignee: PINCO SA, Rancate (CH)

( * ) Notice: Subject to any disclaimer, the term of this patent is extended or adjusted under 35 U.S.C. 154(b) by 0 days.

(21) Appl. No.: 16/843,621

(22) Filed: Apr. 8, 2020

(65) Prior Publication Data

US 2020/0369991 A1 Nov. 26, 2020

Related U.S. Application Data

(63) Continuation of application No. 13/979,041, filed as application No. PCT/IB2012/000036 on Jan. 13, 2012, now abandoned.

(51) Int. Cl.
*C12G 1/02* (2006.01)
*C12G 1/00* (2019.01)

(52) U.S. Cl.
CPC .............. *C12G 1/02* (2013.01); *C12G 1/005* (2013.01)

(58) Field of Classification Search
CPC .................................. C12G 1/005; C12G 1/02
See application file for complete search history.

(56) References Cited

U.S. PATENT DOCUMENTS

2013/0280374 A1   10/2013   Catelli et al.

FOREIGN PATENT DOCUMENTS

| CN | 1 482 232 | 3/2004 |
|---|---|---|
| CN | 101205511 A | 6/2008 |
| CN | 201304122 Y | 9/2009 |
| DE | 10 2004 011396 | 9/2005 |
| JP | 3147775 | 6/1991 |
| JP | 4258271 | 9/1992 |
| KR | 100 751 061 | 8/2007 |

OTHER PUBLICATIONS

PCT/IB2012/000036 titled Process for the Treatment and the Winemaking of Grapes—Notification Concerning Transmittal of International Preliminary Report on Patentability (International Preliminary Report on Patentability, including Written Opinion of the International Searching Authority) dated Jul. 25, 2013.
PCT/IB2012/000036 titled Process for the Treatment and the Winemaking of Grapes—International Search Report dated Apr. 5, 2012.
Gabler, et al., "Influence of Fumigation with High Concentrations of Ozone Gas on Postharvest Gray Mold and Fungicide Residues on Table Grapes," *Postharvest Biology and Technology*, 55(1):85-90 (2010).
Tiwari, B.K., et al., "Anthocyanins and Color Degradation in Ozonated Grape Juice," *Food and Chemical Toxicology*, 47(11): 2824-2829 (2009).
Pascual, et al., "Use of Ozone in Food Industries for Reducing the Environmental Impact of Cleaning and Disinfection Activities," *Trends in Food Science and Technology*, 18: S29-S35 (2006).
Rohn, J. Grape Expectations for Ozone Treatment, *Chemistry & Industry*, 3: 11 (Feb. 12, 2007).
CN 201280005381.1 titled "Process for the Treatment and the Winemaking of Grapes," First Notification of Office Action dated Feb. 13, 2014.
Artés-Hernández, Francisco, et al., "Enriched Ozone Atmosphere Enhances Bioactive Phenolics in Seedless Table Grapes After Prolonged Shelf Life," *J. Sci. Food Agri.*, 87: 824-831 (2007).
Non-Final Office Action for U.S. Appl. No. 13/979,041, entitled "Process for the Treatment and the Winemaking of Grapes," consisting of 22 pages. dated Sep. 28, 2016.
Long, Z., "White Table Wine Production in California's North Coast Region"—Wine Production Technology in the United States, ACS Symposium Series 145, American Chemical Society, 1981, pp. 29-57.
York, J., "Good Winery Management—why so much spoiled wine"—San Diego Amateur Winemaking Society, Sep. 19, 2009, pp. 1-4, http://www.gencowinemakers.com/docs/Good%20Winery%20Sanitation.pdf, downloaded Sep. 20, 2016.
Hampson, B., "Use of ozone for winery and environmental sanitation"—Practical Winery & Vineyard Journal, Jan./Feb. 2007, http://www.practicalwinery.com/janfebOO/ozone.htm, downloaded Sep. 20, 2016.
Final Office Action for U.S. Appl. No. 13/979,041, entitled "Process for the Treatment and the Winemaking of Grapes," consisting of 16 pages. dated Apr. 19, 2017.
Advisory Action for U.S. Appl. No. 13/979,041, entitled "Process for the Treatment and the Winemaking of Grapes," consisting of 6 pages. dated Jul. 7, 2017.
Non-Final Office Action for U.S. Appl. No. 13/979,041, entitled "Process for the Treatment and the Winemaking of Grapes," consisting of 15 pages. dated Apr. 2, 2018.
Final Office Action for U.S. Appl. No. 13/979,041, entitled "Process for the Treatment and the Winemaking of Grapes," consisting of 15 pages. dated Sep. 14, 2018.

(Continued)

*Primary Examiner* — Elizabeth Gwartney
(74) *Attorney, Agent, or Firm* — Hamilton, Brook, Smith & Reynolds, P.C.

(57) ABSTRACT

A grape treatment and wine making process characterised by the steps of: cleaning a first container by means of a fluid mixed with ozone; placing the grapes in said first container in closed vats and/or buildings at controlled temperature; diffusing a fluid mixed with ozone within said vats and/or buildings at controlled temperature; cleaning said grapes placed in said first container by means of a fluid mixed with ozone; cleaning a press by means of a fluid mixed with ozone; pressing said grapes with said press to produce must; cleaning a second container by means of a fluid mixed with ozone; placing said must in said second container to produce fermented must; cleaning a third container by means of a fluid mixed with ozone; placing said fermented must (wine) in said third container.

31 Claims, No Drawings

(56) References Cited

OTHER PUBLICATIONS

Advisory Action for U.S. Appl. No. 13/979,041, entitled "Process for the Treatment and Tthe Winemaking of Grapes," consisting of 7 pages. dated Dec. 10, 2018.
Non-Final Office Action for U.S. Appl. No. 13/979,041, entitled "Process for the Treatment and the Winemaking of Grapes," consisting of 14 pages. dated Apr. 8, 2019.
Final Office Action for U.S. Appl. No. 13/979,041, entitled "Process for the Treatment and the Winemaking of Grapes," consisting of 13 pages. dated Oct. 8, 2019.

PROCESS FOR THE TREATMENT AND THE WINEMAKING OF GRAPES

RELATED APPLICATIONS

This application is a continuation of U.S. application Ser. No. 13/979,041, filed Jul. 10, 2013, which is the U.S. National Stage of International Application No. PCT/162012/000036, filed on Jan. 13, 2012, published in English, which claims priority under 35 U.S.C. § 119 or 365 to Italy, Application No. BG2011A000002, filed Jan. 14, 2011. The entire teachings of the above applications are incorporated herein by reference.

DESCRIPTION

The present invention relates to a grape wine making process, in particular a wine making process using ozone, and to the wine obtained in this manner.

In the agrofood and wine making industry, disinfection is an extremely important procedure. For this purpose chlorine or other chemical compounds are generally used such as, in the case of grapes and wine, sulphur dioxide, which in addition to eliminating the overall microbial load present in the product, can also to cause quality alterations and allergic effects in some consumers.

Sulphitation is also a frequent practice in the biological field as it performs the function of oxidation control and microbial development control, and enables must acidification. These important advantages are accompanied by a large number of significant disadvantages: hydrogen sulphide formation and hence bad odour; wine ripening delay due to malolactic fermentation; toxicity in man (mutagenic and allergic effect) in the form of bronchospasms, irritations etc. Another not inconsiderable problem is that the sulphite ion easily binds to sugars and to ketonic acids in which the grape must and then the wine are rich, so that the sanitizing effect decreases. Moreover the sulphites are always added in excess to ensure that a free sulphurous and hence sanitizing quantity is available. If from a wine making viewpoint the free availability is the more important, for the consumer it is the total quantity (combined+free) which counts, this generally being up to 5 times more, depending on the wine.

The first sulphite addition takes place immediately on arrival of the grapes in the hopper or with the arrival of the pressed product, to a quantity of about 10 g per 100 kg of grapes.

At the end of alcohol fermentation the total sulphite and free $SO_2$ levels are checked to verify that these are at least 40 mg/l of total sulphites and 14 mg/l of free $SO_2$: if the level is less, further sulphites are added to reach the required level by adding potassium metabisulphite, knowing that 1 g of metabisulphite per 100 litres produces about 2 mg of free $SO_2$ and about 5 mg of total sulphites per litre.

At the end of malolactic fermentation, sulphite is again added to bring the total sulphite concentration to 30 mg/l and the free $SO_2$ concentration to 22 mg/l.

The concentrations are even higher for white wines and even more for sweet wines.

The stated levels are those used in Italy, whereas in countries such as Germany and Austria the total sulphite levels can even reach 120 mg/l because of the greater susceptibility to acetic grape fermentation due to field inoculation in relation to climatic conditions, and because of a higher residual sugar quantity than that of so-called dry wines.

The document CN101438733 describes the sterilization of red table grapes by washing them for 10-15 minutes with water mixed with ozone (10-12 ppm of ozone). Hence an alternative sterilization is described for a product for immediate consumption having organoleptic characteristics different from wine-making grapes. No suggestion is given as to how such a process can also be used for a lengthy complex procedure such as grape wine making.

The Applicant has studied and considered experimental results obtained by treating harvested products, in terms of elicitation effect due to induced superoxidative stress, by the stimulus and accumulation of added value substances of salutistic type for man (mainly flavanol, flavonols and stilbenes).

The Applicant has also realized that a further positive characteristic of ozone is represented by the high instability of the molecule used in the form of ozone (O3), which rapidly degrades to reform oxygen (O2) without leaving residues which are harmful or which can negatively alter the wine quality. This characteristic is considered positive within the framework of also using ozone sterilization in a long-duration process such as wine making and in winemaking processes of biological type.

The Applicant has further realized that if the grapes and all the materials used in wine production were treated with ozone it would no longer be necessary to add sulphites to prevent wine contamination.

An object of the present invention is to provide a process for grape treatment and wine making which enables the grapes to be sanitized and their microbial load to be eliminated such as to enable a considerable reduction in the use of sulphitation.

Another object is to provide a process which produces a stress effect of induced oxidative nature on the grapes, such as to act as a stimulus for the synthesis/accumulation of substances (secondary metabolites) recoverable in the grapes and in the final product (wine), and considered as of nutritious power for the health of the consumer and having a quality value for the wine.

A further object is to provide a process which produces a stabilization effect on the final product (wine), enabling the addition of sulphites to be avoided on termination of the wine making process.

Finally, another important object is to reduce the environmental impact of the process in view of the low energy consumption in producing ozone, the reduction in water consumption and its recycling, the lesser $CO_2$ emission compared with the production of sulphites and detergents synthesized industrially, and the complete absence of residual contaminants.

According to the present invention, these and further objects are attained by a grape treatment and wine making process characterised by the steps of: cleaning a first container by means of a fluid mixed with ozone; placing the grapes in said first container in closed vats and/or buildings at controlled temperature; diffusing a fluid mixed with ozone within said vats and/or buildings at controlled temperature; cleaning said grapes placed in said first container by means of a fluid mixed with ozone; cleaning a press by means of a fluid mixed with ozone; pressing said grapes with said press to produce must; cleaning a second container by means of a fluid mixed with ozone; placing said must in said second container to produce fermented must; cleaning a third container by means of a fluid mixed with ozone; placing said fermented must in said third container.

Further characteristics of the invention are described in the dependent claims.

The advantages of this solution compared with the solutions of the art are various.

Those grapes which have undergone treatment in accordance with the present invention presented the advantage of eliminating the microbial load originally present on the berry surface to a level such as not only not to prejudice the quality and health of the wine, but indeed to improve its health by eliminating pathogenic fungi able to produce ochratoxins. The treatment also results in reduction in indigenous yeast levels normally located on the grape skin. This means that the sulphitation procedures used in traditional wine making processes to control the triggering of spontaneous formation can be avoided.

A further surprisingly innovative advantage obtained by the described process is given by the stimulation and/or accumulation of value added substances advantageous for the properties of the grapes and of the wine produced by them together with facilitating their extraction from the grapes, in particular polyphenols the most important of which are flavonols, flavanols, stilbenes and phenolic acids (gallic acid). It has in effect been found that the grapes react to the stress of the ozone treatment by increasing the concentration of these substances, and that these substances are transferred by the grapes (berries) to the wine with greater ease, so increasing their concentration.

In particular, a high and significantly higher polyphenol and anthocyanin extraction in red wines (between 35 and 50%) is obtained due to a combination of mechanisms: exposing the grapes to ozone at the correct concentration and for the correct times stimulates the production of these compounds in the grapes before pressing, and determines skin permeability, resulting in greater extractability. Treatment at the correct concentration for the correct duration also favours synthesis and extractability of aromatic compounds. The antiseptic effect of ozone makes it possible not to add sulphites during wine making because bacteria, yeasts and mould are eliminated on the starting grapes, and all the equipment used is sterilized.

Paradoxically, a wine can be produced without sulphites which is treated with ozone to achieve greater polyphenol and anthocyanin extraction, then adding sulphites before bottling to ensure its long term stability, the product obtained being in any event different from that produced by adding sulphites onto the grapes before pressing. The pre-harvesting residues present on the grapes (pesticides, herbicides, etc.) are eliminated as the ozone oxidizes them. Pesticides and herbicides are substances sensitive to oxidation and treatment with ozone, which is a super-oxidant and neutralizes their active principle.

Again, there is the advantage of favouring stabilization of the wine produced from ozonized grapes by reducing the sulphite levels to only the residues originating from the fermentation yeasts.

In addition the water used for washing can be discharged without problems as it is not contaminated chemically but possibly only biologically, and if this latter is the case it can be treated with ozone to hence make it reusable for irrigation or for some other profitable use.

The characteristics and advantages of the present invention will be apparent from the ensuing detailed description of one embodiment thereof, given by way of non-limiting example.

The process provides for wine making in a suitable room previously washed with ozonized water and/or fumigated with ozone in gaseous form, using equipment disinfected by treatment with ozone in air and/or in water. This is also the case if wooden containers are used, which although having the advantage of a certain permeability and the transfer of pleasant flavours, have the problem of easy contamination, for example by *Brettanomyces*, which is difficult to resolve with normal water treatment.

Washing with ozonized water and/or fumigation with gaseous ozone have the additional object of annulling the drawbacks associated with the use of wooden casks.

The process comprises the production of ozonized water by a specific generator provided with a computerized system, able to continuously blow ozone into the aqueous medium and to ensure the control and stabilization of all the required parameters (ozone concentration, water temperature, ozonized water volume).

The purpose of washing the grapes in ozonized water is to ensure an initial removal or decrease of microflora, with particular attention to *Botrytis cinerea* and other pathogenic fungi which can produce ochratoxin, but also to bacteria which can alter the wine (acetic and lactic bacteria). In this respect, normal wash procedures have shown an insignificant reduction in *Botrytis cinerea* compared with grapes stored without any water intervention.

The process also makes it possible to disinfect the rooms and instruments used for wine making by blowing in ozone in gaseous form. Again in this case the operation is controlled and entirely managed by a specific ozone generator provided with a computerized system able to maintain a constant ozone concentration and blowing time controlled at the values necessary to achieve the object.

The grapes, even if not subjected to the wash process, are located in one or more layers in perforated plastic boxes of the type used for wilting/dehydration procedures within confined environments, such as hermetically sealed buildings. The boxes can have dimensions and consequent product loading capacities which are variable (from 3-5 to 8-10 kg) and can be handled on pallets. This characteristic enables piles of boxes to be organized containing grapes in a form such as to be able to utilize in the most suitable manner the internal spaces of the dedicated rooms and the effective movement of the internal air with the purpose of making the gaseous ozone treatment uniform and efficient. This treatment takes place by the controlled infeed of the ozone produced by the generator, which is able to ensure continuous control of quantities (concentrations) and grape exposure times within the aforesaid controlled rooms, in which the relative temperature and humidity conditions for the grapes are suitably monitored and controlled.

Suitably arranged ventilation systems are provided for correct movement of the internal air and to favour effective diffusion of the gaseous ozone which strikes the grape bunches and hence the grape berries by also passing through the perforated structure of the boxes. Effective reaching of the entire surface of the grape berries is also facilitated by preferably locating the grape bunches in a single layer on the box floor. The rooms used for storage and for the treatment operations are previously adequately sanitized by washing with ozonized water and/or by infeeding gas at higher concentrations than those scheduled for the product treatments.

The ozone necessary for the process is produced in known manner, for example by the corona discharge method which enables air to be obtained with ozone concentrations up to about 6% by weight.

An ozone production unit using the corona effect consists of the following parts: an oxygen source, anti-dust filters, gas driers, ozone generators, contact and catalytic destruction unit. For ozone production, atmospheric air (provided by a compressor) or air enriched with pure oxygen can be used.

The quantity of ozone-containing air depends on the grape quantity. For example for 2.8 metric tons of grapes, stored in boxes containing grapes in a single layer and located in a closed building, a sterilization process was carried out lasting 12 hours. In the first 4 hours 40 g/hour of ozone were blown in, with 1 g/hour of ozone blown in during the next 8 hours, for a total of 168 g of ozone, equivalent to about 60 g for each metric ton of grapes.

In the building, at the exit for the blown air, a manganese dioxide converter is located to convert the remaining ozone into oxygen.

The treatment duration can be chosen according to the particular case. For example, if the ozone production is low, the duration can be longer. In any event, the concentration must be initially very high to quickly saturate the building and to accelerate initial sterilization of even the minimum product contamination. When the environment is saturated, the procedure switches to maintaining the ozone quantity present in the building.

For washing with water containing ozone, the water is prepared by enriching it with ozone to reach a concentration of 6-8 mg of ozone per litre of water at 15° C.

Contact with the grapes (and with the equipment used in the process) takes place by immersion or by spraying.

In particular, by washing the grapes with water containing ozone, the water droplets remain partially on the grape berries to prolong the time of the sterilization process.

To wash the equipment used in the process, a wash of about one hour is carried out with an ozone concentration of about 6-8 mg per litre of water.

According to the proposed procedure, after sanitizing with ozone in water and/or in air, the grapes are poured into the stalk stripper previously washed with ozonized water and/or fumigated with gaseous ozone, its exit pipe leading directly to the press, also previously washed with ozonized water and/or fumigated with gaseous ozone.

After completing pressing, the must is collected in a hopper or vessel cleaned with ozonized water and/or fumigated with gaseous ozone, and collected in containers previously treated with ozonized water and/or ozone in the gaseous phase.

When the container is filled, fermentation proceeds. The upper hole of the container through which the must has been introduced is closed with a suitable stopper washed with ozonized water and/or fumigated with gaseous ozone, without the need for previous addition of potassium metabisulphite (antimicrobial antioxidant preservative). On termination of all the wine making steps, the wine produced is poured into containers (bottles) previously washed with ozonized water and/or fumigated with gaseous ozone.

The ozone treatment conducted on the grapes has provided important results with regard to the phenolic fraction as can be seen in Table 1. In this respect, after just one day of treatment, while the anthocyanin fraction has not undergone variation, other phenolic fractions such as gallic acid, catechins and epicatechins have demonstrated significantly high increments as can be seen from Table 2. This signifies a strong activation of the antioxidant phenolic fractions which play an important role from the enological (stabilization) and health viewpoint.

Table 3 below show the values of chemical analyses of enological interest conducted on 33 different wine batches, of which No. 15 corresponds to the batch in which ozone was used on the grapes and for washing the wine making equipment, and in which sulphites were not used in the wine making. It can be seen that the wine, originating from wilted grapes and treated with ozone for one week, has about 15° alcohol with a residual sugar level of 1.30 g/l, the lowest value of all samples, indicating that fermentation has taken place very regularly. This could be attributed to the greater ease with which the yeasts have acted, not finding competitors. The volatile acidity, which in the absence of sulphur dioxide represents an index of the risk of irregular fermentation, has instead remained in line with the other wines (0.28 g/l). The total and free $SO_2$ have remained very low and significantly lower than in the other wines. It is no surprise to also find $SO_2$ values in non-sulphurated wines. This is because yeasts themselves are producers of sulphurated compounds, and more so under stress conditions. Hence the level found can be considered physiological. An interesting confirmation of the aforestated is the significant increase in tannins which is the second highest of all the batches.

The development of the wine over time while in the steel container was regular without any sulphur dioxide increase during the malolactic fermentation which as can be seen from the final malic acid value (0.05) proceeded regularly. The volatile acidity underwent a slight physiological increase with the malolactic fermentation but always within the limits of a good quality wine.

Finally the polyphenolic fraction (anthocyanins, total polyphenols, tannins) remained unaltered during the progress of the malolactic fermentation.

The increase in polyphenols and anthocyanins can be noted from Table 4, which relates to bottled wines of two years ageing with the grapes and all the used equipment cleaned with ozone in accordance with the aforestated quantities. Hence a wine can be noted containing polyphenols and anthocyanins in a greater percentage than that of a wine produced by the traditional process, and in particular polyphenols 30% greater and anthocyanins 60% greater.

TABLE 1

| Sample | Delfidin 3 Glucoside | Cyanidin 3 Glucoside | Petunidin 3 Glucoside | Peonidin 3 Glucoside | Peonidin 3 Acetyl Glucoside | Malvidin 3 Glucoside | Malvidin 3 Acetyl Glucoside | Peonidin 3 Cumaroyl Glucoside | Malvidin 3 Cumaroyl Glucoside | Total |
|---|---|---|---|---|---|---|---|---|---|---|
| 9 Sep. | 3 | 0.6 | 3.2 | 5.5 | 2.0 | 45.7 | 33.1 | 0.7 | 6.2 | 42.0 |
| 10 Sep. | 2 | 0.4 | 2.6 | 6.4 | 2.2 | 47.7 | 31.8 | 0.8 | 6.1 | 40.9 |

TABLE 2

| Sample | Anthocyanins pH 1 | Anthocyanins pH 3.2 | Extract % | PFT Index 280 (pH 1) | Gallic acid ppm | Catechins ppm | Epicatechins ppm |
|---|---|---|---|---|---|---|---|
| 9 Sep. | 65 | 33 | 49 | 14.2 | 21 | 2 | 18 |
| 10 Sep. | 65 | 32 | 51 | 15.3 | 29 | 3 | 30 |

TABLE 3

| No | Alcohol | Sugars (g/l) | Total Acidity | pH | Net Volatile Acidity | Total SO2 | Free SO2 | Colour Intesity | Tonality | Malic Acid (g/L) | Total Polyphenolsi (mg/l) | Anthocyanins (mg/L) | Tannins (g/L) |
|---|---|---|---|---|---|---|---|---|---|---|---|---|---|
| 1 | 12.71 | 2.75 | 6.15 | 3.13 | 0.29 | 50 | 20 | 36.380 | 0.331 | 1.93 | 3918 | 791 | 3.95 |
| 2 | 14.38 | 2.15 | 5.73 | 3.55 | 0.38 | 77 | 23 | 10.540 | 0.528 | 1.39 | 2670 | 358 | 3.31 |
| 3 | 13.77 | 2.35 | 5.61 | 3.57 | 0.36 | 69 | 22 | 7.230 | 0.578 | 1.46 | 2374 | 312 | 3.05 |
| 4 | 13.26 | 2.25 | 5.58 | 3.58 | 0.34 | 72 | 19 | 7.000 | 0.607 | 1.09 | 2824 | 282 | 2.28 |
| 5 | 13.83 | 2.20 | 5.51 | 3.59 | 0.27 | 62 | 22 | 6.890 | 0.612 | 1.3 | 2595 | 299 | 2.95 |
| 6 | 13.35 | 2.10 | 7.1 | 3.39 | 0.21 | 50 | 18 | 7.730 | 0.592 | 1.8 | 3341 | 515 | 3.84 |
| 7 | 11.79 | 1.75 | 6 | 3.39 | 0.28 | 36 | 11 | 4.740 | 0.535 | 1.66 | 1679 | 123 | 2.42 |
| 8 | 14.97 | 2.90 | 8.08 | 3.07 | 0.33 | 45 | 13 | 8.780 | 0.456 | 1.29 | 2211 | 94 | 3.41 |
| 9 | 13.84 | 2.40 | 6.63 | 3.25 | 0.29 | 32 | 10 | 7.440 | 0.514 | 1.19 | 1870 | 81 | 3.11 |
| 10 | 12.30 | 2.70 | 6.5 | 3.34 | 0.28 | 35 | 11 | 6.620 | 0.513 | 1.38 | 1819 | 89 | 2.31 |
| 11 | 12.46 | 2.30 | 6.5 | 3.3 | 0.27 | 39 | 13 | 5.160 | 0.497 | 1.47 | 1598 | 72 | 2.09 |
| 12 | 12.82 | 2.55 | 6.39 | 3.34 | 0.36 | 37 | 12 | 5.550 | 0.513 | 1.39 | 1601 | 60 | 2.87 |
| 13 | 13.37 | 2.56 | 6.24 | 3.3 | 0.27 | 40 | 13 | 6.860 | 0.548 | 1.25 | 1924 | 73 | 2.89 |
| 14 | 13.59 | 2.61 | 6.54 | 3.23 | 0.30 | 34 | 12 | 6.640 | 0.520 | 1.26 | 1722 | 75 | 2.47 |
| 15 | 14.81 | 1.30 | 6.88 | 3.44 | 0.28 | 25 | 7 | 10.340 | 0.532 | 2.25 | 2547 | 180 | 3.89 |
| 16 | 12.78 | 1.70 | 6.76 | 3.36 | 0.33 | 41 | 14 | 13.920 | 0.413 | 1.46 | 2511 | 338 | 3.02 |
| 17 | 12.69 | 2.40 | 7.88 | 3.17 | 0.39 | 31 | 11 | 15.930 | 0.392 | 1.12 | 2421 | 227 | 3.07 |
| 18 | 14.53 | 2.30 | 5.31 | 3.55 | 0.47 | 36 | 12 | 13.250 | 0.554 | 1.2 | 2884 | 308 | 3.83 |
| 19 | 14.93 | 2.50 | 5.96 | 3.43 | 0.42 | 33 | 10 | 10.210 | 0.630 | 1.91 | 2116 | 199 | 3.37 |
| 20 | 12.88 | 2.00 | 5.54 | 3.56 | 0.23 | 56 | 19 | 13.290 | 0.448 | 1.46 | 2647 | 292 | 3.53 |
| 21 | 14.60 | 4.20 | 6.92 | 3.34 | 0.43 | 61 | 18 | 13.270 | 0.520 | 1.56 | 2450 | 280 | 3.34 |
| 22 | 14.81 | 2.90 | 7.55 | 3.24 | 0.39 | 45 | 14 | 15.790 | 0.456 | 1.55 | 2698 | 295 | 3.78 |
| 23 | 15.31 | 2.40 | 7.87 | 3.14 | 0.35 | 33 | 12 | 19.340 | 0.426 | 1.65 | 2703 | 340 | 3.65 |
| 24 | 14.73 | 3.20 | 8.25 | 3.1 | 0.38 | 53 | 16 | 9.240 | 0.451 | 1.32 | 2235 | 190 | 3.2 |
| 25 | 14.39 | 2.50 | 5.33 | 3.66 | 0.40 | 75 | 24 | 8.980 | 0.660 | 1.34 | 2573 | 195 | 3.45 |
| 26 | 14.71 | 10.90 | 7.77 | 3.22 | 0.52 | 63 | 14 | 10.890 | 0.552 | 1.59 | 1443 | 185 | 3.61 |
| 27 | 13.36 | 2.90 | 7.33 | 3.23 | 0.37 | 51 | 14 | 13.000 | 0.481 | 1.62 | 2218 | 270 | 3.36 |
| 28 | 14.71 | 3.20 | 7.01 | 3.31 | 0.44 | 45 | 14 | 13.120 | 0.507 | 1.64 | 2478 | 283 | 3.62 |
| 29 | 12.04 | 3.40 | 7.57 | 3.16 | 0.35 | 38 | 12 | 7.610 | 0.541 | 1.65 | 1284 | 60 | 2.66 |
| 30 | 14.70 | 14.00 | 6.98 | 3.41 | 0.49 | 83 | 18 | 11.990 | 0.559 | 1.69 | 2287 | 170 | 3.86 |
| 31 | 12.47 | 1.20 | 6.41 | 3.44 | 0.38 | 32 | 11 | 8.560 | 0.582 | 1.8 | 2588 | 214 | 3.25 |
| 32 | 12.40 | 1.00 | 6.34 | 3.44 | 0.36 | 30 | 11 | 8.040 | 0.581 | 1.69 | 2542 | 196 | 3.29 |
| 33 | 12.41 | 1.10 | 6.47 | 3.43 | 0.35 | 30 | 12 | 8.570 | 0.577 | 1.79 | 2547 | 200 | 3.33 |

TABLE 4

| PARAMETERS | Control wine in accordance with the known art | Wine in accordance with the present invention | Variation % |
|---|---|---|---|
| Alcohol (%) | 13.16 | 13.89 | +5.55 |
| Sugars (g/l) | 1.5 | 1 | −33 |
| Titratable acidity (g/l tartaric acid) | 6.69 | 5.96 | −10.9 |
| pH | 3.28 | 3.51 | +7 |
| Net volatile acidity (g/l) | 0.39 | 0.43 | +10.3 |
| Total $SO_2$ (mg/l) | 74 | 24 | −67.6 |
| Free $SO_2$ (mg/l) | 30 | 7 | −76.7 |
| Intensity | 18.71 | 26.69 | +42.7 |
| Malic acid (g/l) | 0.60 | 0.1 | −83.3 |
| Total poliphenols (mg/l) | 2740 | 3655 | +33.4 |
| Anthocyanins (mg/l) | 455 | 780 | +71.4 |
| Catechin e Epicatechin (mg/l) | 3.42 | 3.95 | +15.5 |

The invention claimed is:

1. A grape treatment and wine making process comprising:
   cleaning a first container by means of a fluid mixed with ozone;
   placing wine-making grapes in said first container in a closed vat or building at a controlled temperature;
   diffusing a fluid mixed with ozone at a first concentration within said closed vat or building at the controlled temperature, said diffusing sanitizing the wine-making grapes and causing an increase of phenolic fractions within the wine-making grapes;
   diffusing a fluid mixed with ozone at a second concentration within said vat or building at the controlled temperature, said first concentration being reduced to said second concentration to reduce oxidative stress of the wine-making grapes while increasing phenolic fractions within the wine-making grapes;
   cleaning a press by means of a fluid mixed with ozone;
   pressing said wine-making grapes with said press to produce must;
   cleaning a second container by means of a fluid mixed with ozone;
   placing said must in said second container and fermenting said must to produce fermented must;
   cleaning a third container by means of a fluid mixed with ozone; and
   placing said fermented must in said third container.

2. A process as claimed in claim 1, further comprising, prior to said pressing step, the steps of bringing a stalk stripper into contact with a fluid mixed with ozone; and stripping said wine-making grapes from their stalks.

3. A process as claimed in claim 1, wherein said fluid used to clean the first container is air, and said fluid used to clean the second and third containers is water.

4. A process as claimed in claim 1, wherein at least one of said fluids is air.

5. A process as claimed in claim 1, wherein said first container comprises boxes, said wine-making grapes being placed in said boxes in single or multi-layers.

6. A process as claimed in claim 1, wherein said second container is a vessel, a cask, or a silo.

7. A process as claimed in claim 1, wherein each container, vat, or building used in said process is brought into contact with a fluid mixed with ozone.

8. A process as claimed in claim 1, wherein sulphites are not added to said must.

9. A process as claimed in claim 1, wherein said third container is a bottle.

10. A process as claimed in claim 1, wherein said first, second and third container are cleaned with water containing 6-8 mg of ozone per litre.

11. Wine produced by the process of claim 1, wherein said wine contains more polyphenols than that of a wine produced by a process not using ozone.

12. The wine of claim 11, wherein said wine contains more anthocyanins than that of a wine produced by a process not using ozone.

13. The wine of claim 11, wherein said wine comprises up to 60% greater concentration of anthocyanins and up to 30% greater concentration of polyphenols as compared to a wine produced by a process not using ozone.

14. The wine of claim 11, wherein said wine does not have added sulphites.

15. A red wine produced by the process of claim 1, wherein an extraction of polyphenols and anthocyanins from the grapes during pressing of the grapes or during fermentation of the must is at a percentage between 35% and 50%.

16. A process as claimed in claim 1, wherein 2.8 metric tons of said wine-making grapes are exposed to diffused fluid mixed with ozone at said first and second concentration, said exposure lasting for 12 hours, wherein 40 g of ozone are blown into the closed vats or buildings each hour for the first 4 hours, and 1 g of ozone is blown into the closed vats or buildings each hour for the subsequent 8 hours.

17. Wine produced by the process of claim 16, wherein said wine comprises 60% greater concentration of anthocyanins and 30% greater concentration of polyphenols as compared to a wine produced by a process not using ozone.

18. A process as claimed in claim 1, wherein said first concentration is substantially greater than said second concentration.

19. A process as claimed in claim 18, wherein said first concentration is at least 40 times greater than said second concentration.

20. A process as in claim 1, wherein the first concentration of ozone is about 40 grams per hour per 2.8 metric tons of wine-making grapes for about four hours, and the second concentration of ozone is about 1 gram per hour per 2.8 metric tons of wine-making grapes for about eight hours.

21. A process as in claim 1, wherein the first concentration of ozone and the second concentration of ozone are together about 60 grams of ozone per metric ton of wine-making grapes.

22. A grape treatment and wine making process comprising:

diffusing a fluid mixed with ozone at a first concentration within a closed vat or building having a container of wine-making grapes disposed therein, said diffusing causing an increase of phenolic fractions within the wine-making grapes; and diffusing a fluid mixed with ozone at a second concentration within said vat or building, said first concentration being reduced to said second concentration.

23. The process of claim 22 further comprising cleaning said first container by means of a fluid mixed with ozone prior to cleaning said wine-making grapes and, after cleaning said wine-making grapes:

cleaning a press by means of a fluid mixed with ozone;
pressing said wine-making grapes with said press to produce must;
cleaning a second container by means of a fluid mixed with ozone;
placing said must in said second container and fermenting said must to produce fermented must;
cleaning a third container by means of a fluid mixed with ozone; and
placing said fermented must in said third container.

24. The process of claim 22, further comprising maintaining the vat or building at a controlled temperature.

25. Wine produced by the process of claim 2, wherein said wine contains more polyphenols and anthocyanins than that of a wine produced by a process not using ozone.

26. The wine of claim 25, wherein said wine comprises 60% greater concentration of anthocyanins and 30% greater concentration of polyphenols as compared to a wine produced by a process not using ozone.

27. The wine of claim 25, wherein said wine does not have added sulphites.

28. The process of claim 22, wherein said first concentration is substantially greater than said second concentration.

29. The process of claim 28, wherein said first concentration is at least 40 times greater than said second concentration.

30. A process as in claim 22, wherein the first concentration of ozone is about 40 grams per hour per 2.8 metric tons of wine-making grapes for about four hours, and the second concentration of ozone is about 1 gram per hour per 2.8 metric tons of wine-making grapes for about eight hours.

31. A process as in claim 22, wherein the first concentration of ozone and the second concentration of ozone are together about 60 grams of ozone per metric ton of wine-making grapes.

* * * * *

UNITED STATES PATENT AND TRADEMARK OFFICE
CERTIFICATE OF CORRECTION

PATENT NO. : 11,332,703 B2
APPLICATION NO. : 16/843621
DATED : May 17, 2022
INVENTOR(S) : Catelli et al.

Page 1 of 1

It is certified that error appears in the above-identified patent and that said Letters Patent is hereby corrected as shown below:

On the Title Page

After item (65), please insert:
-- (30) Foreign Application Priority Data
Jan. 14, 2011 (IT) ......................................BG2011A000002 --.

In the Claims

In Claim 25, Column 10, Line 26, please delete "2" and insert -- 22 --.

Signed and Sealed this
Ninth Day of August, 2022

Katherine Kelly Vidal
*Director of the United States Patent and Trademark Office*